United States Patent [19]

Berger et al.

[11] 4,171,681
[45] Oct. 23, 1979

[54] FISH TANK SYSTEM

[75] Inventors: Michael Berger, Pullach; Jürgen Flüchter, Pähl; Hans J. Moeller, Ronnenberg, all of Fed. Rep. of Germany

[73] Assignee: Linde Aktiengesellschaft, Wiesbaden, Fed. Rep. of Germany

[21] Appl. No.: 798,545

[22] Filed: May 19, 1977

[30] Foreign Application Priority Data

May 19, 1976 [DE] Fed. Rep. of Germany ....... 2622373

[51] Int. Cl.² .................. A01K 61/00; B01D 47/00
[52] U.S. Cl. ........................................ 119/3; 119/2; 261/64 R
[58] Field of Search .................. 119/2, 3, 4, 5; 261/64 R

[56] References Cited

U.S. PATENT DOCUMENTS

| | | | |
|---|---|---|---|
| 3,116,712 | 1/1964 | Ogden et al. | 119/3 |
| 3,495,572 | 2/1970 | Groves | 119/3 |
| 3,996,893 | 12/1976 | Buss | 119/3 |
| 4,116,164 | 9/1978 | Shabi et al. | 119/3 |

Primary Examiner—Louis G. Mancene
Assistant Examiner—Michael J. Foycik, Jr.

[57] ABSTRACT

In a process for the growing of aquatic animals in a controlled environment wherein water is continuously circulated through a tank, the improvement which comprises introducing fresh water into said tank having an inner wall; at the upper rim sufficiently tangential to said inner wall of the tank and at a sufficient rate to maintain a circular water flow throughout the tank, and discharging wastewater at the lower end of the tank.

6 Claims, 1 Drawing Figure

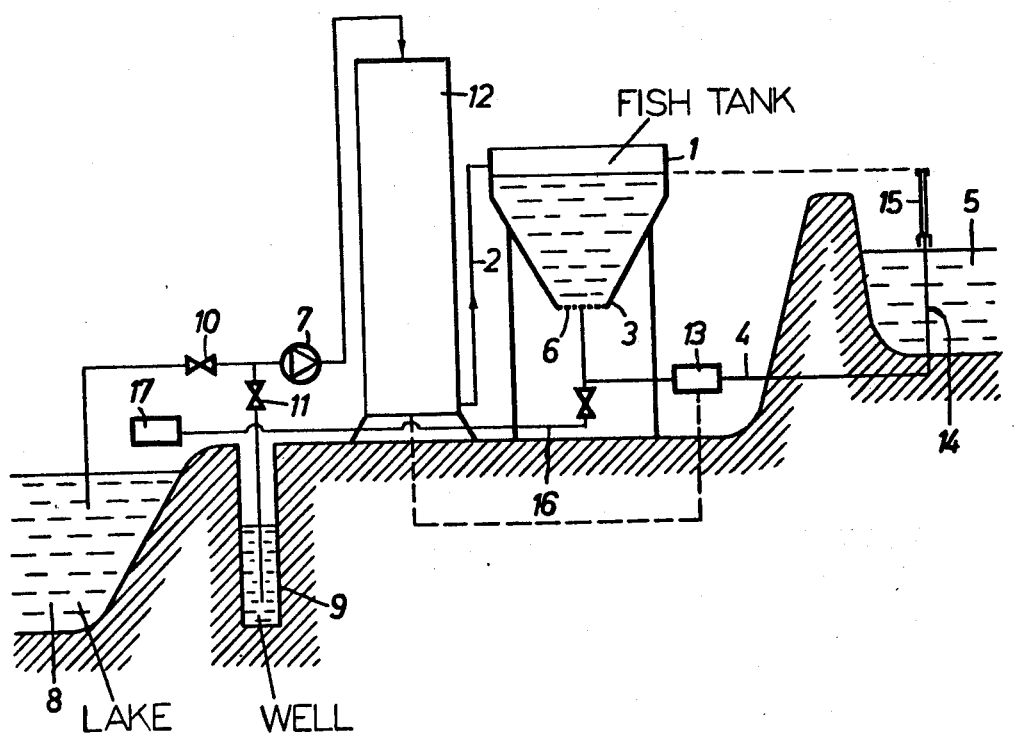

FISH TANK SYSTEM

BACKGROUND OF THE INVENTION

This invention relates to a process and apparatus for growing aquatic animals, for example fish, in a controlled environment wherein water is continuously circulated.

A process for improving growing conditions of fish is described in DOS No. 2,110,091 wherein oxygen-enriched water, preferably pumped from a spring or a well, and an oxygen-containing gas are circulated continuously from the bottom to the top of a fish tank. A particular embodiment provides cascade flow wherein several tanks are arranged in side-by-side relationship at different heights so that overflow water from the tank located at a higher level, after purification and renewed oxygen enrichment, is passed through the tank arranged at the next-lower level. In this way, water consumption is lowered as a function of the number of cascades.

In this conventional upward-flow system, problems arise in the discharge of the metabolic wastes produced by the fish or of other waste matter from the tanks. If the upward velocity of the water is too slow, the metabolic wastes produced by the fish settle downwardly against the current of water and gas. Thus, the wastes remain suspended at the bottom of the tank or even clog up the oxygen inlet. In any case, the residence time of the fecal waste in the tank is detrimentally increased leading to such manifestations as taste impairment or poisoning of the fish.

A similar deleterious effect is produced when the upward flow of water is too rapid, owing to the resultant turbulence which suspends the fecal waste throughout the tank.

Accordingly, the amount of water conducted upwardly through the tanks is critical for optimum environmental growth conditions. However, it is not a simple task to quickly adjust and maintain the water flow within the prescribed or critical limits, and this complicates the growing operation. Furthermore, as the fish grow, the rate of oxygen introduced into the tanks must in turn be increased, and this can likewise lead to detrimental turbulent conditions.

SUMMARY OF THE INVENTION

An object of this invention is to provide a system for growing aquatic animals, especially fish, in containers wherein the separation of fecal wastes from the tanks is effectively conducted in a simple manner and does not impair the environmental conditions of the aquatic animals.

Upon further study of the specification and appended claims, further objects and advantages of this invention will become apparent to those skilled in the art.

To attain these objects, fresh water is introduced into the tanks at the upper rim sufficiently tangentially to the inner wall of the tanks and at a sufficient rate of flow so as to maintain a circular water flow within the tanks; and discharging wastewater at the lower end of the tanks.

Due to the features of continuously introducing the fresh water at the upper rim of the tanks tangentially to the inner walls thereof and of maintaining a circular water flow in the tanks from the surface of the water to the lower end of the tanks, for example by a cylindrical configuration of the tanks, as well as continuously discharging a like quantity of water at the lower ends of the tanks, unused feed, metabolic wastes and other wastes, are continuously discharged with the wastewater. This process works substantially independently of the normal flow velocities of the water in the tanks which are necessarily different for the various types and sizes of the aquatic animals. This procedure is also accomplished without mechanical accessories and without any substantial residue of impurities left in the tanks. Consequently, the cleaning of the tanks can be scheduled for rather long intervals of time during which the aquatic animals can remain in their tanks until they have attained their desired size.

Another factor bearing on an economical operation of a growing system for aquatic animals is the use of a high animal density, based on the given water volume in the tank. This, though, requires a high oxygen content in the water fed into the tanks. This water must also be of purity sufficient to extensively preclude the occurrence of diseases among the aquatic animals. Furthermore, the introduced water should have a certain temperature range because most of the aquatic animals are cold-blooded fish which adapt their body temperature to the surroundings. Consequently, their metabolic rate is directly dependent on the ambient temperature. For this reason, since the growth of most of the cultivated aquatic animals slows down in cold water, the fresh water introduced into the tanks should be at an optimum temperature during the entire growing period to obtain a year round increase in weight, optimum feed utilization, and optimum growth rate.

Therefore, according to another aspect of the process of this invention, the fresh water to be introduced into the tanks is advantageously, at least during the daytime, a mixture of oxygen-rich, warm surface water, and groundwater having a low microorganism content, e.g. a mixture of lake water or river water and spring water. Surface waters, such as lake water or river water, exhibit an increased oxygen content closely below its water level due to the direct contact of the water level with the surrounding atmosphere and is relatively warm during the day due to the radiation of the sun. Conversely, unpolluted spring water or groundwater, in contrast to the above, is relatively cold and low in oxygen, but has the advantage of being extensively free of microorganisms, thus reducing the danger of a bacterial or viral infestation of the aquatic animals. Also, groundwater is generally readily available for use in fish ponds and the like as compared to surface water which is becoming increasingly scarce. By adjusting the ratio between surface water and groundwater, the quality of the fresh water can be adapted to the optimum water temperatures and oxygen contents required for the varying living conditions of the aquatic animals.

However, it is also possible, of course, to utilize unmixed surface water or groundwater, insofar as it satisfies the quality requirements of the growing operation. Moreover, the wastewater discharged from the tank and having been subjected to a clarification step after discharge can be used advantageously as the fresh water, at least partially. In this connection, the fresh water can be taken directly from a clarification pond or, in case of an extensive contamination of the wastewater, from a clarification plant preferably operated with oxygen.

In all cases, it is advisable, especially in the winter months, to effect prewarming of the fresh water to be introduced by heating or waste heat utilization, for example from power plants or cooling towers, in order to be able to maintain the required temperatures in the tanks, which temperatures, for instance, are about 12° to 16° C. for trouts or about 23° to 27° C. for eels or carps.

Since the oxygen content of the introduced waters frequently does not correspond to the oxygen contents optimal for the growing of aquatic animals, it has proven to be especially advantageous to enrich the fresh water additionally, prior to its introduction into the tanks, with almost pure oxygen or with an oxygen-containing gas to an oxygen content adapted to the living conditions of the aquatic animals. Thus, independently of the initially present oxygen contents in the fresh water to be utilized, the water in the tanks can thus be kept constantly at a specific oxygen content.

The oxygen enrichment of the fresh water outside of the tanks does not interfere with the circular water circulation within the tanks desirable for separation of waste products. Conversely, if the oxygen enrichment step were conducted with the aid of gas nozzles or spargers within the tanks, the thus-produced vertical convection would interfere with the desired circular circulation. The additional provision of an oxygen-enrichment system in the tanks proper can, however, be advantageously provided as an emergency supply system in case the oxygen-enrichment system in the fresh water feed line breaks down.

The living conditions for the aquatic animals are maximally favorable, with respect to the oxygen content, if the water in the tanks is enriched to an oxygen content of about 8–12 mg. $O_2$/liter of water.

As for controlling the magnitude for the oxygen content of the fresh water to be introduced, it is possible to utilize the oxygen content of the wastewater withdrawn at the lower end of the tank. From the values measured in the wastewater, it is possible to derive the entire consumption of oxygen in the tanks, and the oxygen content in the feed of the container must be correspondingly raised or lowered. It is possible, in this simple way, to maintain the oxygen content in the tank at a constant value despite possibly different mixture conditions between surface water and groundwater and thus differing oxygen contents in the fresh water prior to the oxygen treatment.

Furthermore, it has been found in fish breeding that an adjustment of the rotational velocity of the water in the tanks to an average value of 0.7 times the body length of the fish per second contributes towards advantageous growing conditions during breeding as well as in case of fry or in case of larger fishes. However, in this connection, a maximum velocity of 0.3 m./sec. should not be exceeded, since otherwise the counter movements of the fish become too vigorous, which would result in an increased energy consumption, i.e. a lower weight increase of the fish.

Since various species of aquatic animals, especially certain fish, swim as a matter of habit countercurrently and rainbow trout, for example, swim preferably in the counter-clockwise direction, it is advantageous to effect the introduction of the fresh water countercurrently to the preferred travel direction of the aquatic animals, for example in case of rainbow trout in the clockwise direction. Thereby, it becomes possible to affect the distribution of these aquatic animals in the tanks so that greater order exists and the possible stocking density in the tanks can be increased. Furthermore, the aquatic animals increase, due to their swimming movements which counteract the water current, the thus-produced circular flow in the tanks and consequently accelerate the transportation of the occurring metabolic wastes and impurities in the water toward the lower ends of the tanks.

During the discharge of these metabolic wastes and impurities with the wastewater from the tanks, there is the danger that the wastewater conduits become clogged up by sedimentation of fecal wastes. In order to avoid this disadvantage, it is expedient to produce hydraulic surges in the wastewater conduits causing a renewed turbulence of the settling particles. In such a case, a cumbersome mechanical cleaning of the wastewater conduits, which would additionally mean an interruption in the breeding operation, can then be omitted.

An apparatus for conducting the process of this invention advantageously comprises several vertical cylindrical tanks with respectively one water feed means arranged at the upper rim of the tank tangentially to the inner tank wall, and with respectively one wastewater conduit connected at the lower end of the tank.

In this connection, a screen or perforated plate located at the lower end of the respective tank in front of the wastewater conduit connection can prevent the aquatic animals from swimming or being swept out of the tanks; the free cross sections of such a screen or perforated plate is chosen so that the flocculent matter contained in the water can just barely pass through, whereas the aquatic animals cannot do so.

Furthermore, the water feed means can comprise an oxygen enrichment system, and the wastewater conduits can comprise a measuring unit in communication with the oxygen enrichment system for measuring the oxygen content in the wastewater. By way of the measuring unit in the wastewater conduits, it is possible, with a predetermined value for the minimum and maximum oxygen contents of the fresh water to be introduced, to determine the oxygen consumption of the aquatic animals in correspondence with the optimum living conditions of the aquatic animals, and the oxygen enrichment system in the water feed conduits can thus be exactly controlled. If additionally, the oxygen enrichment system is designed, for example, as a packed column providing an extensively loss-free oxygen enrichment, an extremely economical oxygen utilization can be attained.

To produce hydraulic surges in the wastewater to prevent clogging of the wastewater conduits, it is advantageous to provide that the wastewater conduits terminate in a clarification pond, the water level of which is below that of the containers, in pipes projecting above the water level of the clarification ponds up into the height of the water level in the respective tanks, and futhermore to provide that the extreme partial sections of the pipes, projecting from the water, are removable. After detaching these partial sections, the wastewater conduits terminate below the water level of the tanks, whereby a hydraulic shock is produced in the water current within the wastewater lines, which shock stirs up the waste matter sedimented within the conduits and entrains the matter. By repeating this procedure, it is possible in this simple way to ensure a continuous discharge of the wastewater and thus to maintain the purity of the water in the tanks. At the same time, the level of the outlet port of the pipes determines the height of the water level in the tanks.

BRIEF DESCRIPTION OF THE DRAWING

The attached drawing is a schematic illustration of a preferred embodiment of the invention.

DETAILED DESCRIPTION OF PREFERRED EMBODIMENT

The figure shows a vertically disposed, cylindrical tank 1 having the configuration of a funnel in the lower portion and having water passing therethrough continuously; this tank constitutes the living space of the aquatic animals. A water feed conduit 2 terminates in the tank 1 tangentially to the inner tank wall at the upper rim of the tank. At the lower end 3 of the tank 1, a wastewater conduit 4 is connected which is in communication with a clarifying pond 5. Consequently, during the continuous introduction of water, a circular water current is produced from the surface of the water in tank 1 to the lower end 3 of the tank 1; by means of this water current, the produced fecal wastes and other solid matter are discharged in a cyclone-like fashion and pass into the wastewater conduit 4.

To prevent the aquatic animals from likewise migrating into the wastewater conduit 4 and into the clarifying pond 5, a screen 6 is arranged at the lower end 3 of the tank 1 in front of the connection of the wastewater conduit 4; the free cross sections of such screens correspond to the flocculent matter contained in the water.

The tanks 1 are provided with automatic food dispensers (not shown) and have illuminating devices for stimulating favorable daytime and nighttime phases to control the feeding urge.

The water feed conduit 2, wherein a pumping system 7 is installed, connects the tank 1 by way of a branch line to a lake 8 and a well 9 extending into the groundwater, so that the tank 1 can be supplied with a mixture of lake water which is relatively warm and rich in oxygen on the surface and of groundwater or spring water which, in contrast thereto, is relatively cold and low in oxygen, but relatively free of microorganisms.

Since control valves 10 and 11, respectively, are arranged in the respective branch conduit to the lake 8 or the well 9 in order to control the respective throughflow cross section, this water mixture to be introduced into the tank 1 can be adapted to the temperature and oxygen conditions which are most favorable for the aquatic animals in the tank 1. To obtain a maximally high stocking density of the aquatic animals in the tank 1, the oxygen content in the water to be introduced must, however, be maximally high, i.e. it should be adjustable to approximately 8–12 mg. $O_2$/liter of water. However, in case of groundwater, there is usually, at most, an oxygen content of 4–5 mg. $O_2$/l. water. Since a mixture of the groundwater with surface water is insufficient in most instances for such high oxygen values in the fresh water, an oxygen enrichment system 12 which can be a packed column, for example, is disposed in the water feed means 2 downstream of the pumping system 7.

This oxygen enrichment system 12 is in communication with a measuring unit 13 in the wastewater conduit 4, which measures the oxygen content of the wastewater. After a desired oxygen content in tank 1 has been predetermined, it is thus possible to control the oxygen enrichment system 12 in correspondence with the respective, measured oxygen consumption.

To serve as an emergency supply, it is furthermore possible to arrange an oxygen enrichment system, not shown in the figure, in tank 1 which, when the primary oxygen enrichment system 12 has failed, ensures the oxygen content corresponding to the optimum living conditions for the aquatic animals. This further oxygen enrichment system can also be connected to the measuring unit 13.

The wastewater conduit 4 terminates in the clarifying pond 5 in a pipe 14 projecting above the water level of the clarifying pond 5 up into the height of the level of the water in tank 1; the extreme section 15 of this pipe can be detached. The water level of the clarifying pond 5 is disposed below the height of the water in tank 1. The removal of the section 15 thus results in a level equalization between the tank 1 and the clarifying pond 5, initiated by a hydraulic shock in the wastewater conduit 4. This flushing process prevents sludging of the wastewater conduit 4 by waste products settling therein from the wastewater.

For the convenient harvesting of the aquatic animals from the tanks 1, a branch conduit 16 provided with a sealing element is connected likewise at the lower end 3 of the tank 1. Consequently, after removal of the screen 6 arranged in front of the wastewater conduit 4 and after opening the sealing element of the branch conduit 16, it is possible to collect the aquatic animals at the end of the branch conduit 16, e.g. in strainers 17.

It is, of course, possible for the simultaneous rearing of aquatic animals of various kinds or of aquatic animals of the same species but of different sizes to arrange several of the aforedescribed tanks in side-by-side relationship, each having its own water supply and discharge means.

EXAMPLE

Trouts are grown in a plant consisting of six vertically disposed cylindrical tanks, each having a capacity of 28 cubic meters. The upper cylindrical portion of the tanks with a height of 1.90 m. has an outer diameter of 4 m. At the lower portion of each tank, a funnel-like contraction, the height of which is 1.50., creates a vortex in the water before being discharged from the tanks. The tanks are supplied with fresh water that is mixed of ground water having a temperature of 8° C. and of surface water with a temperature of 20° C. In growing trouts, the most preferable temperature is 14° C. Therefore, equal parts of groundwater and surface water are used.

To guarantee an oxygen content of 10 mg./liter of water in the tanks, the fresh water is enriched with oxygen in a packed column. A preferable oxygen content in the fresh water is 35 mg. $O_2$/liter and can only be achieved by treating the fresh water with a gas having a substantially higher concentration of oxygen than air has or with pure oxygen.

In the beginning of a growing period, 66,000 small trouts, each having a weight of 50 g., are equally distributed in the tanks, thus each tank receiving 11,000 trouts. In a three-month-period, the individual weight increases to 300 g., due to the optimal growing conditions, and the trouts are ready for consumption. At the end of the growing period, the ratio between the weight of the water in the tanks and the weight of the trouts is about 8.5 to 1. As big fishes use more oxygen than small ones, the amount of oxygen-enriched fresh water increases continuously during the growing period. This rising demand of oxygen is realized by increasing the amount of water introduced to the tanks. In a medium state of the growing period, 25 cubic meters of fresh water are introduced to each tank per hour.

The preceding examples can be repeated with similar success by substituting the generally or specifically described reactants and/or operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the growing of aquatic animals in a controlled environment wherein the aquatic animals are kept, separated according to species in separate tanks, each of the tanks having an inner wall, wherein fresh water is introduced into the tanks at the upper rim sufficiently tangentially with respect to said inner wall of the tank, and at a sufficient rate to maintain a circular water flow in each of said tanks; wherein waste water is discharged at the lower end of each of said tanks; and, wherein the fresh water, prior to its introduction into the tanks, is enriched in a zone outside of said tanks to an oxygen content adapted to the living conditions of the aquatic animals, the improvement comprising: enriching the fresh water with substantially pure oxygen and employing the oxygen content of the waste water discharged at the lower end of said tanks as the control variable for said zone wherein the fresh water is enriched prior to its introduction into the tanks.

2. Apparatus for conducting the process according to claim 1, comprising, one or more cylindrical tanks (1), each of said tanks comprising, respectively one fresh water feed conduit (2) arranged at the upper rim of each of said tanks tangentially to the inner wall each of said tanks, and respectively one waste water conduit (4) connected at the lower end (3) of the tanks (1), and at least one oxygen enrichment system (12) in the fresh water supply lines, characterized in that: said at least one oxygen enrichment system (12) is placed in a zone outside of said tanks; said at least one oxygen enrichment system (12) is connected to a source of substantially pure oxygen; the waste water conduits (4) comprise a measuring unit (13) in communication with the oxygen enrichment system (12) for measuring the oxygen content of waste water, said measuring unit (13) controlling said at least one enrichment system (12).

3. Apparatus according to claim 2, characterized in that the wastewater conduits (4) terminate in a clarifying pond (5) in pipes (14) projecting above the water level of the clarifying pond (5) up into the height of the water levels in the respective tanks (1), wherein the extreme partial sections (15) of the pipes are removable.

4. A process according to claim 1, wherein the aquatic animals are fish, and the rotational velocity of the water in the tanks is adjusted to an average value of 0.7 times the body length of the fish per second, but maximally to 0.3 m./sec.

5. A process according to claim 1, wherein the fresh water is introduced countercurrently to the preferred travel direction of the aquatic animals.

6. A process according to claim 1, wherein the waste water is discharged at a point in a vertical plane above the bottom level of said tanks, and hydraulic surges are produced in waste water conduits, during the discharge of the waste water from the tanks by lowering the vertical point of the discharge of the waste water therefrom, thereby preventing clogging of the conduits.

* * * * *